(12) United States Patent
Hernandez

(10) Patent No.: US 9,821,716 B1
(45) Date of Patent: Nov. 21, 2017

(54) TIRE-MOUNTED STEP STOOL

(71) Applicant: William Hernandez, Tampa, FL (US)

(72) Inventor: William Hernandez, Tampa, FL (US)

(*) Notice: Subject to any disclaimer, the term of this patent is extended or adjusted under 35 U.S.C. 154(b) by 0 days.

(21) Appl. No.: 15/208,107

(22) Filed: Jul. 12, 2016

(51) Int. Cl.
*B60R 3/00* (2006.01)

(52) U.S. Cl.
CPC .................................. *B60R 3/007* (2013.01)

(58) Field of Classification Search
CPC .. B60R 3/007; B60R 3/00; B60R 3/02; E06C 5/00; E06C 5/02
See application file for complete search history.

(56) References Cited

U.S. PATENT DOCUMENTS

| | | | | |
|---|---|---|---|---|
| 4,800,987 A * | 1/1989 | Liles | ...................... | B60R 3/007 182/150 |
| 4,947,961 A * | 8/1990 | Dudley | ................... | B60R 3/007 182/150 |
| 5,111,909 A * | 5/1992 | Liu | ......................... | B60R 3/007 182/150 |
| 5,133,429 A | 7/1992 | Densley | | |
| 5,456,479 A | 10/1995 | Conger | | |
| D376,784 S | 12/1996 | Miller | | |
| 6,550,478 B2 | 4/2003 | Remmers | | |
| D448,335 S | 10/2005 | Newton | | |
| 6,957,719 B2 | 10/2005 | Ehnes | | |
| 7,059,449 B2 * | 6/2006 | Zhang | ..................... | B60R 3/007 182/127 |
| 7,168,523 B1 * | 1/2007 | Tafoya | .................... | B60R 3/007 182/150 |
| D573,929 S * | 7/2008 | Black | .......................... | D12/203 |
| 7,455,307 B2 | 11/2008 | Seely | | |
| 7,766,357 B2 * | 8/2010 | Arvanites | ............... | B60R 3/007 182/127 |
| 8,091,907 B1 * | 1/2012 | Barnett | ...................... | E06C 5/00 182/150 |
| 8,844,676 B2 * | 9/2014 | Filkowski | ................. | E06C 1/12 182/115 |
| 9,163,456 B2 * | 10/2015 | Price | ........................ | E06C 1/39 |
| 9,500,029 B1 * | 11/2016 | Mullins | ................... | E06C 1/393 |
| 2006/0157301 A1 * | 7/2006 | Embretsen | ............. | B60R 3/007 182/150 |
| 2006/0226624 A1 | 10/2006 | Chen | | |
| 2010/0012431 A1 * | 1/2010 | Ehnes | .................... | B60R 3/007 182/150 |
| 2010/0019468 A1 * | 1/2010 | Price | ...................... | B60R 3/007 280/165 |
| 2010/0122871 A1 | 5/2010 | Gottlinger | | |

FOREIGN PATENT DOCUMENTS

WO          0020707 A1    4/2000

* cited by examiner

*Primary Examiner* — James M Dolak

(57) ABSTRACT

The tire-mounted step stool is a step is adapted for use with a tire of a vehicle. When the tire-mounted step stool is secured to the tire, the tire-mounted step stool forms a platform upon which a person can step to gain access to the roof or engine compartment of the vehicle. The tire-mounted step stool comprises a first panel, a second panel, a first steel bar, a second steel bar, and a plurality of hinges. The first steel bar and the second steel bar are used to attach the first panel to the second panel. The plurality of hinges is used to make the stated attachments in such a manner that the tire-mounted step stool is collapsible.

3 Claims, 3 Drawing Sheets

TIRE-MOUNTED STEP STOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of arrangements of running boards and steps for vehicles, more specifically, an arrangement for accessing the roof of a vehicle or an engine of said vehicle.

SUMMARY OF INVENTION

The tire-mounted step stool is a step is adapted for use with a tire of a vehicle. When the tire-mounted step stool is secured to the tire, the tire-mounted step stool forms a platform upon which a person can step to gain access to the roof or engine compartment of the vehicle. The tire-mounted step stool is adapted to for use in accessing the top of the vehicle, which may involve the roof or the engine compartment.

These together with additional objects, features and advantages of the tire-mounted step stool will be readily apparent to those of ordinary skill in the art upon reading the following detailed description of the presently preferred, but nonetheless illustrative, embodiments when taken in conjunction with the accompanying drawings.

In this respect, before explaining the current embodiments of the tire-mounted step stool in detail, it is to be understood that the tire-mounted step stool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tire-mounted step stool.

It is therefore important that the claims be regarded as including such equivalent construction insofar as they do not depart from the spirit and scope of the tire-mounted step stool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
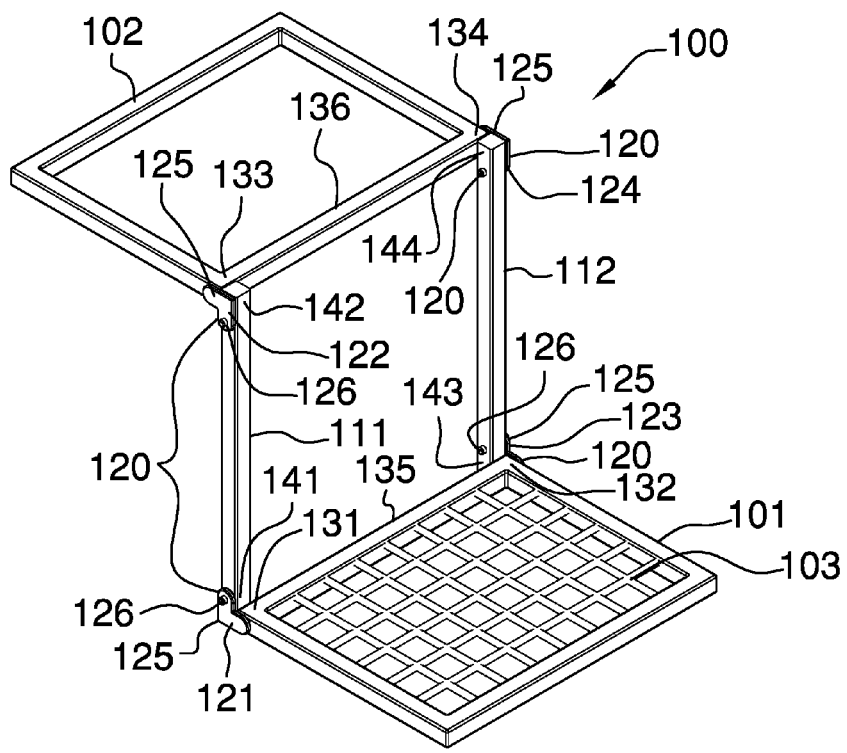
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The tire-mounted step stool 100 (hereinafter invention) comprises a first panel 101, a second panel 102, a first steel bar 111, a second steel bar 112, and a plurality of hinges 120. The invention 100 is a step that is adapted for use with a tire 151 of a vehicle. When the invention 100 is secured to the tire 151, the invention 100 forms a platform upon which a person can step to gain access to the roof or engine compartment of the vehicle. The first steel bar 111 and the second steel bar 112 are used to attach the first panel 101 to the second panel 102. The plurality of hinges 120 is used to make the stated attachments in such a manner that the invention 100 is collapsible. The first panel 101 is further defined with a first corner 131, a second corner 132, and a first working edge 135. The second panel 102 is further defined with a third corner 133, a fourth corner 134 and a second working edge 136. The first working edge 135 connects the first corner 131 to the second corner 132. The second working edge 136 connects the third corner 133 to the fourth corner 134. The first steel bar 111 is further defined with a first end 141 and a second end 142. The second steel bar 112 is further defined with a third end 143 and a fourth end 144.

Figure 5:
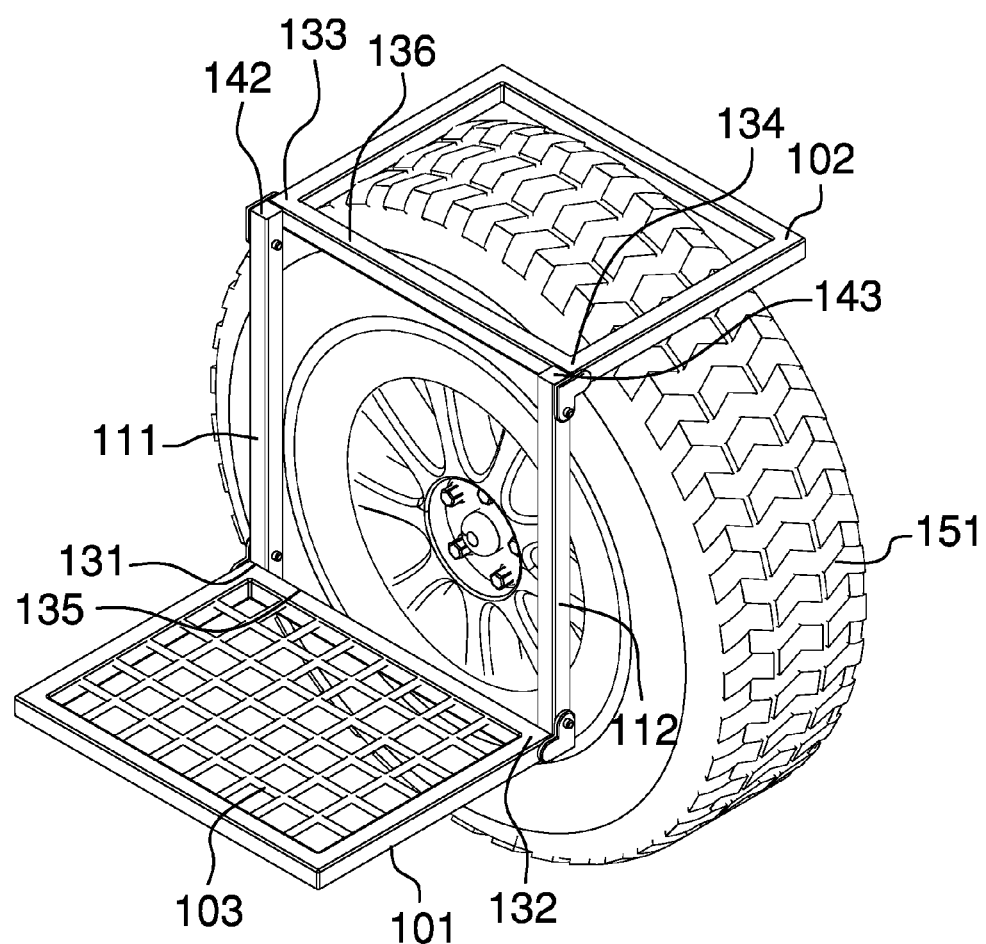
FIG. 5 is an in use view of an embodiment of the disclosure.

As shown most clearly in FIGS. 1 and 5, the second panel 102 is an open second rectangular structure that is welded together from steel tubing. The inner dimensions of the second panel 102 are sized such that the tire 151 can be partially inserted into the opening of the second panel 102. When a tire 151 is inserted into the second panel 102 in this fashion, the friction between the tire 151 and the second panel 102 hold the invention 100 securely in position during use. When the invention 100 is properly used, the third corner 133 and the fourth corner 134 of the second panel 102 are the corners of the second rectangular structure that are distal from the center axis of the vehicle.

In the first potential embodiment of the disclosure, as shown most clearly in FIGS. 1 and 5, the first panel 101 is a first rectangular structure with the same construction and outer dimensions as the second panel 102. The first panel 101 further comprises a steel grate 103 that is used to provide a surface upon which the user may stand. The steel grate 103 is welded to the first rectangular structure. It is preferred that the steel grate 103 be thicker than 13 gauge. When the invention 100 is properly used, the first corner 131 and the second corner 132 of the first panel 101 are the corners of the first rectangular structure that are distal from the center axis of the vehicle. The steel grating 103 may be a commercially available steel grate or commercially available perforated steel sheeting.

Each hinge selected from the plurality of hinges 120 further comprises a commercially available L bracket 125 and a commercially available shaft 126. For each hinge selected from the plurality of hinges 120, the L bracket 125 is welded to a panel selected from the group consisting of the first panel 101 and the second panel 102. The selected hinge is connected to a steel bar selected from the group consisting of the first steel bar 111 and the second steel bar 112 using the shaft 126. The selected steel bar is attached to the selected hinge such that the selected steel bar will rotate relative to the selected panel (or vice versa) using the selected hinge as a pivot.

Figure 2:
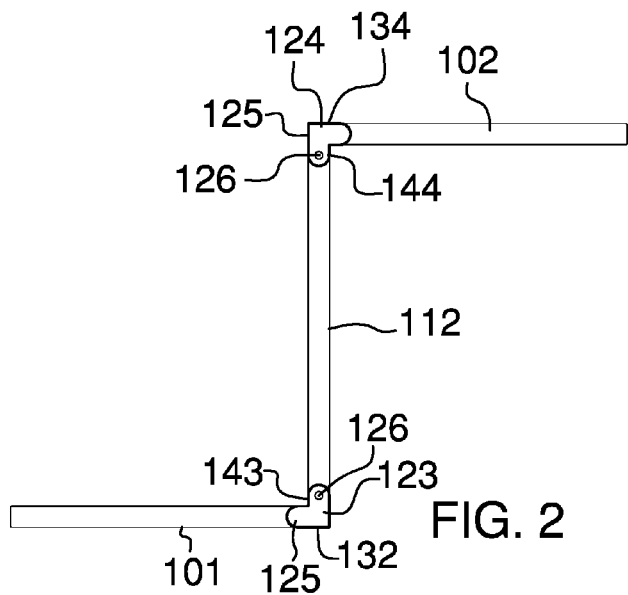
FIG. 2 is a side view of an embodiment of the disclosure.
Figure 3:
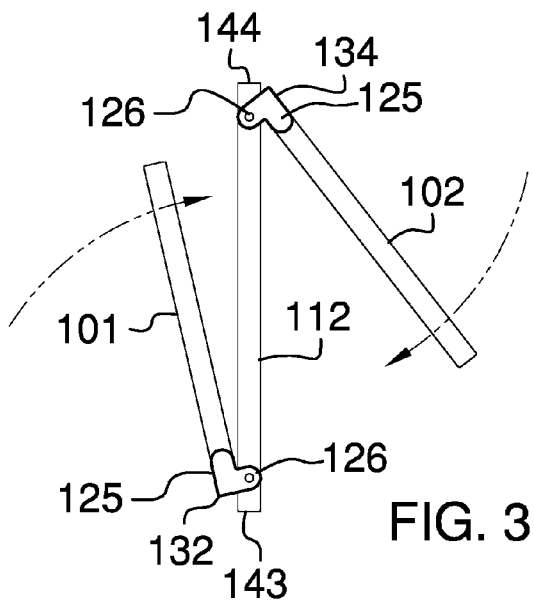
FIG. 3 is a side view of an embodiment of the disclosure.
Figure 4:
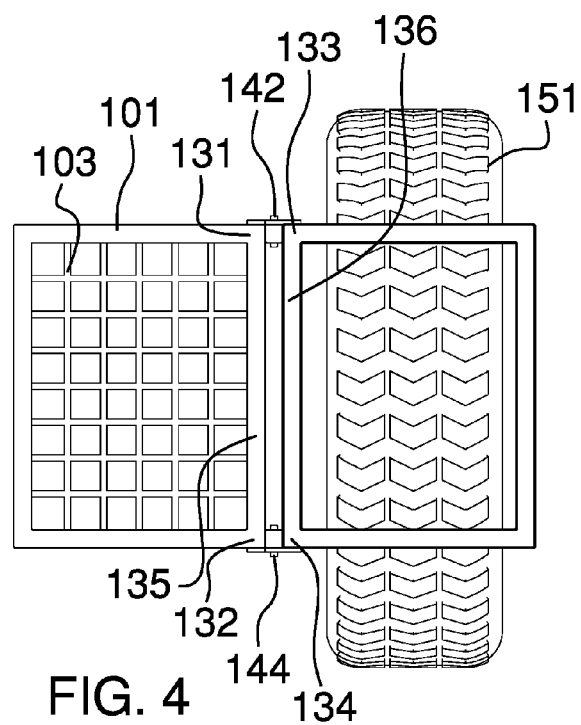
FIG. 4 is a top view of an embodiment of the disclosure.

As shown most clearly in FIGS. 2 and 3, the rotation of the selected steel bar around the selected hinge is limited by either: 1) the selected bar pressing against the panel selected from the group consisting of the first panel 101 or the second panel 102; or, 2) an end of the selected bar selected from the group consisting of the first end 141, the second end 142, the third end 143 or the fourth end 144 pressing up against a working edge selected from the group consisting of the first working edge 135 or the second working edge 136.

In the first potential embodiment of the disclosure, the first hinge 121 attaches the first corner 131 to the first end 141. The L bracket 125 of the first hinge 121 is welded to the first corner 131. The first hinge 121 attaches to the first end 141 such that the shaft 126 of the first hinge 121 forms the pivot of the first hinge 121. The second hinge 122 attaches the third corner 133 to the second end 142. The L bracket 125 of the second hinge 122 is welded to the third corner 133. The second hinge 122 attaches to the second end 142 such that the shaft 126 of the second hinge 122 forms the pivot of the second hinge 122. The third hinge 123 attaches the second corner 132 to the third end 143. The L bracket 125 of the third hinge 123 is welded to the second corner 132. The third hinge 123 attaches to the third end 143 such that the shaft 126 of the third hinge 123 forms the pivot of the third hinge 123. The fourth hinge 124 attaches the fourth corner 134 to the fourth end 144. The L bracket 125 of the fourth hinge 124 is welded to the fourth corner 134. The fourth hinge 124 attaches to the fourth end 144 such that the shaft 126 of the fourth hinge 124 forms the pivot of the fourth hinge 124.

To use the invention 100, the second panel 102 is placed over the tire 151 and the first panel 101 is rotated away from the second panel 102 until the first working edge 135 stops the rotation process. Once usage is complete, the invention 100 is returned to a storage position by rotating the first panel 101 toward the second working edge 136 and rotating the second panel 102 towards the first working edge 135.

The following definitions were used in this disclosure:

Inner Dimension: As used in this disclosure, the term inner dimension describes the span from a first inside or interior surface of a container to a second inside or interior surface of a container. The term is used in much the same way that a plumber would refer to the inner diameter of a pipe.

Hinge: As used in this disclosure, a hinge is a device that permits the turning, rotating, or pivoting of a first object relative to a second object.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pivot: As used in this disclosure, a pivot is a rod or shaft around which an object rotates or swings.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tire-mounted step stool comprising:
a first panel, a second panel, a first steel bar, a second steel bar, and a plurality of hinges;
wherein the tire-mounted step stool is a step that is for use with a tire;
wherein the tire-mounted step stool is secured to the tire;
wherein the tire-mounted step stool forms a platform;
wherein the tire-mounted step stool is used in order to provide access to a top of a vehicle;
wherein the first steel bar and the second steel bar attach the first panel to the second panel using the plurality of hinges;
wherein the tire-mounted step stool is collapsible;
wherein the first panel is further defined with a first corner, a second corner, and a first working edge;
wherein the second panel is further defined with a third corner, a fourth corner and a second working edge;
wherein the first working edge connects the first corner to the second corner;
wherein the second working edge connects the third corner to the fourth corner;
wherein the first steel bar is further defined with a first end and a second end;
wherein the second steel bar is further defined with a third end and a fourth end;
wherein the second panel is an open second rectangular structure;
wherein the second panel is welded together from steel tubing;
wherein the inner dimensions of the second panel are sized such that the tire can be partially inserted into the opening of the second panel;
wherein the third corner and the fourth corner of the second panel are the corners of the second rectangular structure that are distal from a center axis of the tire;

wherein the first panel is a first rectangular structure with the same construction and outer dimensions as the second panel;
wherein the first panel further comprises a steel grate;
wherein the steel grate is welded to the first rectangular structure;
wherein the first corner and the second corner of the first panel are the corners of the first rectangular structure that are distal from the center axis of the tire;
wherein each hinge selected from the plurality of hinges further comprises an L bracket and a shaft;
wherein the L bracket is welded to the first panel or the second panel;
wherein the hinge selected from the plurality of hinges is connected to a steel bar using the shaft;
wherein the steel bar is selected from the first steel bar or the second steel bar;
wherein the steel bar is the first steel bar or the second steel bar is attached to the hinge selected from the plurality of hinges such that the steel bar will rotate relative to the panel using the hinge selected from the plurality of hinges as a pivot;
wherein the rotation of the steel bar around the hinge selected from the plurality of hinges is limited by the selected steel bar pressing against the panel;
wherein the rotation of the steel bar around the hinge selected from the plurality of hinges is limited by an end of the selected steel bar selected from the group consisting of the first end, the second end, the third end or the fourth end pressing up against a working edge selected from the group consisting of the first working edge or the second working edge;
wherein the plurality of hinges is further defined as a first hinge, a second hinge, a third hinge, and a fourth hinge;
wherein the first hinge attaches the first corner to the first end;
wherein the second hinge attaches the third corner to the second end;
wherein the third hinge attaches the second corner to the third end;
wherein the fourth hinge attaches the fourth corner to the fourth end;
wherein the L bracket of the first hinge is welded to the first corner;
wherein the L bracket of the second hinge is welded to the third corner;
wherein the L bracket of the third hinge is welded to the second corner;
wherein the L bracket of the fourth hinge is welded to the fourth corner;
wherein the first hinge attaches to the first end such that the shaft of the first hinge forms the pivot of the first hinge;
wherein the second hinge attaches to the second end such that the shaft of the second hinge forms the pivot of the second hinge;
wherein the third hinge attaches to the third end such that the shaft of the third hinge forms the pivot of the third hinge;
wherein the fourth hinge attaches to the fourth end such that the shaft of the fourth hinge forms the pivot of the fourth hinge;
wherein the first panel is rotated away from the second panel until the first working edge stops the rotation process;
wherein the first panel rotates towards the second working edge;
wherein the second panel rotates towards the first working edge.

2. The tire-mounted step stool according to claim 1
wherein the steel grating is either steel grate or perforated steel sheeting;
wherein the steel grating is thicker than 13 gauge.

3. A tire-mounted step stool comprising:
a first panel, a second panel, a first steel bar, a second steel bar, and a plurality of hinges;
wherein the first steel bar and the second steel bar attach the first panel to the second panel using the plurality of hinges;
wherein the tire-mounted step stool is collapsible;
wherein the tire-mounted step stool is used in order to provide access to a top of a vehicle;
wherein the first panel is further defined with a first corner, a second corner, and a first working edge;
wherein the second panel is further defined with a third corner, a fourth corner and a second working edge;
wherein the first working edge connects the first corner to the second corner;
wherein the second working edge connects the third corner to the fourth corner;
wherein the first steel bar is further defined with a first end and a second end;
wherein the second steel bar is further defined with a third end and a fourth end;
wherein the second panel is an open second rectangular structure;
wherein the second panel is welded together from steel tubing;
wherein the inner dimensions of the second panel are sized such that the tire can be partially inserted into the opening of the second panel;
wherein the first panel is a first rectangular structure with the same construction and outer dimensions as the second panel;
wherein the first panel further comprises a steel grate;
wherein the steel grate is welded to the first rectangular structure;
wherein each hinge selected from the plurality of hinges further comprises an L bracket and a shaft;
wherein the hinge selected from the plurality of hinges is connected to a steel bar using the shaft;
wherein the steel bar is the first steel bar or the second steel bar;
wherein the steel bar is attached to the hinge selected from the plurality of hinges such that the steel bar will rotate relative to the panel using the hinge selected from the plurality of hinges as a pivot;
wherein the plurality of hinges is further defined as a first hinge, a second hinge, a third hinge, and a fourth hinge;
wherein the first hinge attaches the first corner to the first end;
wherein the second hinge attaches the third corner to the second end;
wherein the third hinge attaches the second corner to the third end;
wherein the fourth hinge attaches the fourth corner to the fourth end;
wherein the first hinge attaches to the first end such that the shaft of the first hinge forms the pivot of the first hinge;
wherein the second hinge attaches to the second end such that the shaft of the second hinge forms the pivot of the second hinge;

wherein the third hinge attaches to the third end such that the shaft of the third hinge forms the pivot of the third hinge;

wherein the fourth hinge attaches to the fourth end such that the shaft of the fourth hinge forms the pivot of the fourth hinge.

\* \* \* \* \*